Patented Nov. 4, 1952

2,616,910

UNITED STATES PATENT OFFICE 2,616,910

RENDERING FATS

Charles Pavia, New Market, Va., assignor to Pavia Process, Inc., Washington, D. C., a corporation of Delaware No Drawing. Application March 10, 1949, Serial No. 80,780

3 Claims. (Cl. 260—412.6)

This is a continuation-in-part of my copending application Serial No. 6,811, filed February 6, 1948.

This invention relates to the rendering of fats and more particularly to the method by which fats may be rendered.

An object of this invention is the provision of a process for rendering fats which substantially reduces the time previously required to carry out the process.

Another object of this invention is the provision of such a process which results in a product having a high nutritional value, fine texture and which is of high purity.

A further object of this invention is the provision of such a process which results in a rendered fat that is of rich natural color and flavor, which retains substantially all of its food value, is unburned, nutritious and wholesome.

The most common methods of rendering fats according to prior art techniques, require a prolonged heating period, usually not less than about 3 to 5½ hours. Other processes require even longer times. In accordance with this invention the heating period is sharply reduced to a matter of minutes, usually 5 to 10 minutes or even less under optimum conditions.

When fats are rendered by heating over long periods of time, especially at high temperatures, breaking down of the fat molecules and carbonization usually take place. This not only results in a waste of fat, but also in off flavors being imparted to the rendered fat. In accordance with this invention, there is a complete lack of carbonization of the fat molecules.

In addition to the time required, prior fat rendering processes are also difficult to carry out due to the fact that carbonization of the fat results in "burn on" at the inner surface of the kettle or vessel used in heating. These vessels must be thoroughly scraped and cleaned of these deposits to avoid contamination of subsequent batches. Such scraping and cleaning are laborious and time consuming operations and serve to reduce the production capacity of a fat rendering plant. In accordance with this invention no "burn on" results on the vessels used. The vessels are characteristically free and clear of all such deposits after each batch of fat has been rendered and they can be used over and over again without any deposits accumulating thereon.

Raw fat as it is taken from the carcass of animals is combined with cellular tissues and contains also a significant quantity of chemically uncombined water or moisture. I have found that the presence of this water or moisture is a material detriment in the subsequent rendering of the fat. Accordingly, the first step in my process of rendering fats comprises drying the raw fat by removing the chemically uncombined water or moisture.

Although this step in my process may be accomplished in any number of different ways, I prefer to suspend the raw fat in separate pieces in a mechanically refrigerated chamber at a temperature of about 32° to 40° F. Under these conditions, the uncombined water is distilled from the fat pieces due to the maintenance of a point in the chamber colder than the fat. A liquid will, according to the laws of physics, distill from a warmer point to a cooler point, a fact which is evidenced by the collection of moisture on the inside of window panes in a house, automobile, etc. and by the accumulation of frozen moisture on the cooling coils of a mechanical refrigerator. This distillation process is very effective and thorough in removing the uncombined water or moisture in the fat and is preferred to the use of circulating warm air where temperatures may be encountered above the liquefaction point of the fat.

The cold distillation process is also advantageous from another point of view. As the fat is being dried, it is also being cooled and congealed which prepares it for the next step in the process.

After drying and cooling the fat, it is then comminuted. The greater the degree of comminution, the better are the final results. The comminution may be effected in any number of different ways, such as by chopping, grinding, milling, etc.

The dried comminuted fat is then placed in a heated vessel equipped with an agitator and the agitator should be started before any of the fat is placed in the vessel. The more violent the agitation, the better are the results and the shorter the time required to render the fat.

The temperature of the vessel should be high enough to render the batch temperature above the liquefaction point of the fat. This, of course, will depend upon the particular type of fat being rendered. A batch temperature of 160° F. at atmospheric pressure is usually sufficient for most fats, but other temperatures and pressures may be used. The batch temperature should be kept below 212° F., when operating at atmospheric pressure, to prevent carbonization and disintegration of the fat. This may conveniently be done by using steam jacketed open vessels or by the use of dry or superheated steam directly in contact with the fat in a closed vessel to avoid the addition of extraneous water to the batch.

The violent agitation is maintained throughout the heating period and should include particles near the walls of the vessel to prevent "burn on." During the period of heating and agitation, the fat liquefies and separates from the cellular tissues and any water in the tissues is maintained therein in an adsorbed relation.

After the fat has become liquefied, the resulting mass is strained to obtain the clear fat apart from the cellular tissues. However, any other suitable means for making the separation may be used. The separated fat is then cooled until it solidifies.

The cellular tissue residue is recoverable as a by-product of high nutritional value and is extremely valuable as an ingredient in various foods and feeds, such as bologna, sausages, minced meats, and various other foods and feeds.

The application of this invention is not limited to any particular type of fat, but may be used on any of the various fats known, such as hog, fowl, beef and others.

Having thus described my invention, I claim:

1. The process of rendering fat from fat bearing tissues comprising drying the fat bearing tissues at below the congelation temperature of the fat therein, then comminuting the tissues, heating the dried comminuted tissues in the absence of extraneous water, the while violently agitating them at a temperature above the liquefaction point of the fat therein and below about 212° F. until the fat becomes liquefied, then physically separating the fat from the tissues.

2. The process of rendering fat from fat bearing tissues comprising removing chemically uncombined water from the tissues at below the congelation temperature of the fat, then comminuting the tissues, then heating the comminuted tissues at atmospheric pressure, the while violently agitating the tissues in the absence of extraneous water at a temperature above the liquefaction point of the fat therein and below about 212° F. until the fat becomes liquefied, then physically separating the fat from the tissues and cooling the separated fat.

3. A process as defined by claim 1 in which the drying of the tissues is effected by the distillation of water therefrom.

CHARLES PAVIA.

REFERENCES CITED

The following references are of record in the file of this patent:

UNITED STATES PATENTS

| Number | Name | Date |
|---|---|---|
| 705,034 | Cameron | July 22, 1902 |
| 2,467,529 | Hormel | Apr. 19, 1949 |
| 2,516,071 | Pavia | July 18, 1950 |